Dec. 30, 1969    J. J. BLACKMORE ET AL    3,486,306
LIQUID DOWNFLOW AIR PURGING MEANS FOR A VORTEX
TYPE DE-AERATOR AND THE LIKE
Filed April 5, 1968    2 Sheets-Sheet 1

Inventors
JOSEPH J. BLACKMORE
and PERRY G. GLUNT

By Jerome A. Gross
Attorney

Inventors
JOSEPH J. BLACKMORE
and PERRY G. GLUNT
By [signature]
Attorney

United States Patent Office 3,486,306
Patented Dec. 30, 1969

3,486,306
LIQUID DOWNFLOW AIR PURGING MEANS FOR A VORTEX TYPE DE-AERATOR AND THE LIKE
Joseph J. Blackmore, R.R. 1, Edwardsville, Ill. 62025, and Perry G. Glunt, 91 Wildwood Lane, Kirkwood, Mo. 63122
Filed Apr. 5, 1968, Ser. No. 719,094
Int. Cl. B01d 19/00
U.S. Cl. 55—205                              6 Claims

ABSTRACT OF THE DISCLOSURE

Water down-flow through a by-pass system is used to purge and withdraw air downward from an air-entrapping point. Incorporated in a vortex type de-aerator, the air outlet is near its bottom. A small top central air collection dome has a tube leading axially downward, to carry bubbles of air downward from the top central air collection dome to a liquid reservoir beneath the vortex-containing body. Slowed flow within the reservoir permits upward escape of air bubbles to a second air collection dome in the top of the reservoir, from which it is directed to an expansion tank no higher than the body of the de-aerator itself.

BACKGROUND OF THE INVENTION

This invention is best applied as an improvement to vortex type de-aerator utilized in the separation of air from circulating hot water systems and the like. Typical of such vortex type de-aerators is U.S. Patent No. 3,151,961.

Vortex flow of liquid is induced in a hollow body of circular cross-section by use of a tangential flow inlet and a tangential flow outlet, spaced axially from each other. As the circulating water moves in such vortex flow, entrained air particles escape inwardly and upwardly. In prior art apparatus, an outlet at the top center of the hollow body was connected to an expansion tank located at a higher level; air extracted by the vortex flow would bubble up through the outlet in the connection to the expansion tank.

The principal disadvantage of such prior construction is that the piping of circulating hot water systems normally is located near the ceiling of a room, to permit easy passage thereneath. If a vortex type de-aerator having a top air outlet is located near the ceiling of a room, the additional height required for the expansion tank may require the lowering of the piping in the location of the tank on a floor thereabove.

Accordingly, the principal purpose of the present invention is to provide a vortex type de-aerator having an air outlet located near its bottom, so as to permit location of an expansion tank alongside the de-aerator. Another purpose is to provide means within a vortex type de-aerator to carry air separated at its top downward for release at its bottom. A more general statement of purpose is to purge an air-entrapping point in a circulating water flow system by downflow of part of the water in the system. These, and other purposes which will be apparent from the detailed specification which follows, are achieved in the present invention, which is summarized generally (and without limiting its scope) in the following paragraphs.

SUMMARY OF THE INVENTION

In its general aspect, the present invention avoids the undesired collection and entrapping of air at a high point in a water circulating system, by downflow of the water through a bypass in the system of circulation. A hollow body having a downwardly presented cavity is installed at and above the air entrapping point. A downflow tube whose inlet is centrally located within the cavity constantly washes air from the entrapping point, to rejoin the flow in the system beyond some conventional means to cause a pressure drop therein, such as a flow orifice or strainer.

As the invention is applied to a vortex type de-aerator of otherwise conventional construction, there is no external connection from its top center air collection dome. Instead a downflow tube extends axially from within the air collection dome to and through the bottom wall of the de-aerator body, to a reservoir of relatively still water thereneath. A reservoir outflow tube from the bottom of the reservoir, spaced from the de-aerator tube, connects upwardly to the de-aerator body at a point adjacent to its outflow opening. Thus the downflow tube, reservoir, and outflow tube serve to by-pass part of the flow from the tangential inflow opening of the body to its tangential outflow opening.

The by-pass flow carries air bubbles from the top center air collection dome downward into the reservoir. Recessed within the top wall of the reservoir is a second air collection dome, which has a connection communicating outward through the top wall of the reservoir. Slowed flow within the reservoir permits the bubbles to rise into this second air collection dome. Its height rather than the height of the top center air collection dome, governs the height of the expansion tank, which therefore may be located alongside the de-aerator.

DESCRIPTION OF THE PREFERRED EMBODIMENT

Figure 1:
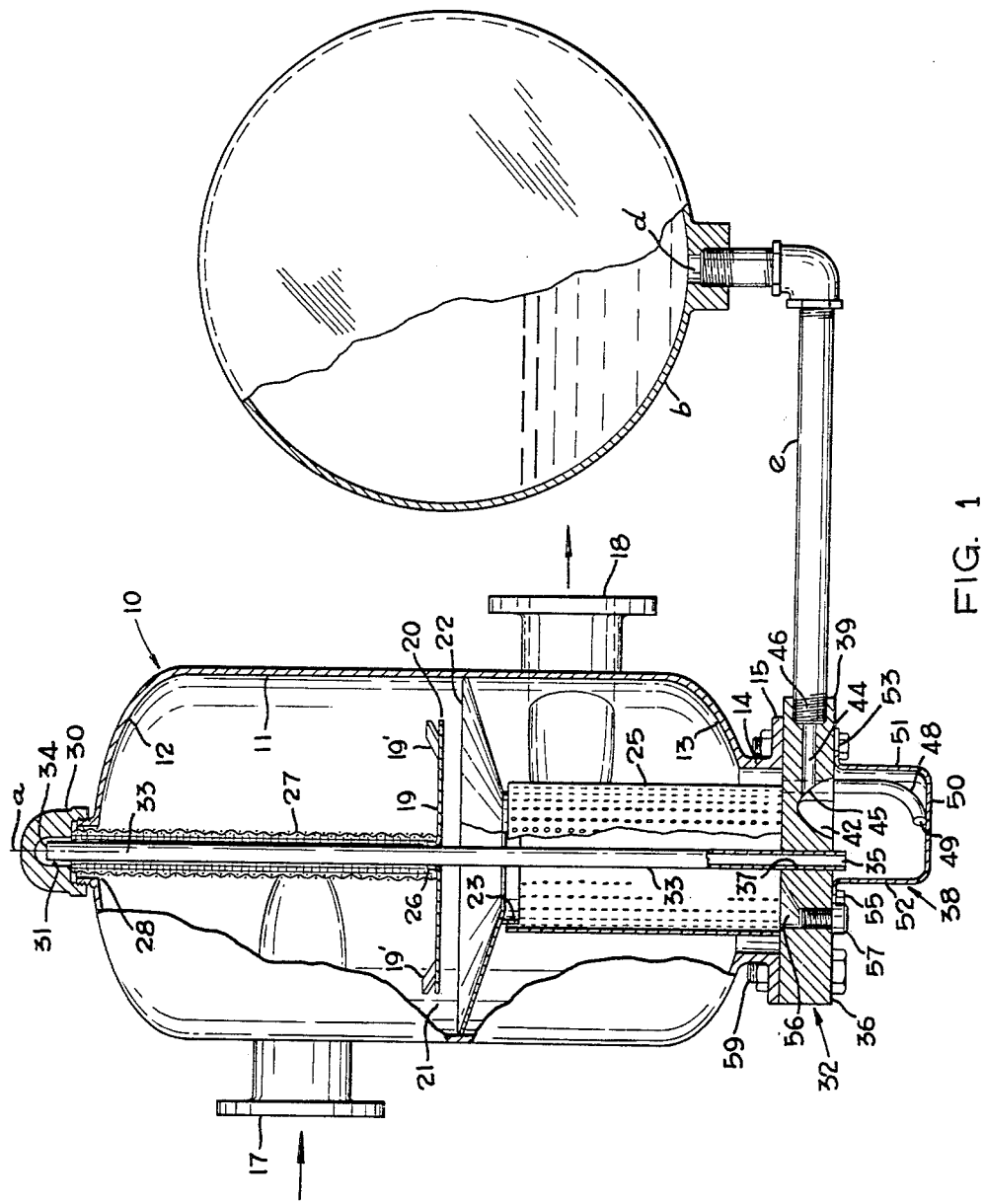
FIG. 1 is a side view principally in section of a vortex type air separator embodying the present invention connected to a conventional expansion tank adjacent on the right.

One of the most significant uses of the present invention is to alter the construction and installation of an otherwise conventional de-aerator, which gathers air at its top, so that it may be installed alongside an expansion tank into which the air is to enter at its bottom. The vortex type air separator functions to extract entrained air particles from circulating water, as in a pumped hot water system, in the same manner as shown in our U.S. Patent No. 3,151,961. Best shown in FIG. 1, it includes a hollow de-aerator body generally designated 10 formed as a surface of revolution about a central vertical axis $a$ so as to provide an inner body wall 11 of circular interior cross-section. The body top wall 12 is preferably rounded as shown. At its lower end, the body 10 has an inward rounded portion 13 leading to a short axially-aligned bottom cylindrical section 14, which terminates in an annular horizontal flange 15.

Rotating flow of the water through the body 10 is provided by a tangential inflow opening 17 located in the generally upper portion of the body 10 and a tangential outflow opening 18 located in the generally lower portion of the body 10. As is well known, such tangential inflow and outflow openings 17, 18 provide rotating flow of liquid therebetween. Positioned at a level between them, well below the inflow opening 17 and supported from the interior of the inner body wall 11 by a plurality of narrow welded vanes 19', is a horizontal circular disk-like baffle 19. As shown in FIG. 1, it is substantially smaller in diameter than the inner wall 11 of the body 10, and has an outer circular edge 20 which defines the inner edge of an annular downflow passage generally designated 21. The passage 21 is constructed by welding to the wall 11 of the body 10, before its top wall 12 and the baffle 19 are welded thereto, a funnel-like truncated conical member 22, which extends downward and inward to a flanged outlet 23, substantially smaller in diameter than the baffle circular edge 20 and the bottom cylindrical section 14. From the flange 23 extends downward a cylindrical strainer 25 whose upper end is supported by the funnel outlet 23, its lower end extending to the level of the lower surface of the flange 15.

The strainer is so positioned inwardly adjacent to the outflow opening 18; water descending around the baffle edge 20 will spiral inwardly down the upper surface of the conical member 22 to the inner side of the strainer 25 and then circulate outwardly through the strainer to the outflow opening 18. Foreign matter caught on the inner surface of the strainer 25 will drop to the dead water region at the bottom of the strainer.

The baffle 19 has, near its center, a small diameter circular upward flange 26. On it is supported a vertical wire mesh air separator screen 27, which is tubular in form and extends up to an upward-flanged opening 28 in the wall 12, externally threaded to receive a screw-on hollow dome cap 30, proportioned as hereafter described.

The entire body 10 will constantly be filled with water circulated by a pump, not shown. As is known from our prior U.S. Patent No. 3,151,961, water so pumped will circulate through the body in a flow path that creates a vortex from the inflow opening 17 downward to the baffle 19; and the vortex will release entrained air particles inwardly and upwardly toward the surface of the vertical mesh screen tube 27, and to the center of the top wall 12, where they tend to merge into bubbles. According to prior practice, a tube leading upward would permit such bubbles to rise into an expansion tank at a higher level.

In the present invention, however, such entrained air particles collect and merge to form bubbles within the dome cap 30; and they are led out in a unique manner, by the elements of the apparatus hereinafter described.

Supported axially within the body 10 by a thick bottom wall plate generally designated 32, bolted onto the lower flange 15, is a downflow tube 33. Its diameter is substantially less than that of the screen 27, but larger than that of the water bubbles which collect in the dome cap 30. It has an upper end inlet 34 within the dome cap 30, spacedly below its upper inner dome surface; and leads downward through the baffle 19 to a tube outlet end 35 which is tightly fitted through a bore 37 in the plate 32 and extends somewhat therebeneath.

The dome 30 is a hollow body having a downward-presented cavity whose inner wall 31 is formed as a surface of revolution about the axis $a$. For best operation, it is so proportioned that the annular space within it at the inflow edge of the upper end inlet 34 of the tube 33 has a cross-sectional area substantially equal to the tube bore. Thus, flow of water upward in the dome 30 over the upper edge 34 of the tube 33 and downward through the tube will proceed at a nearly constant rate, to avoid retention of air within the cavity wall 31.

Figure 2:
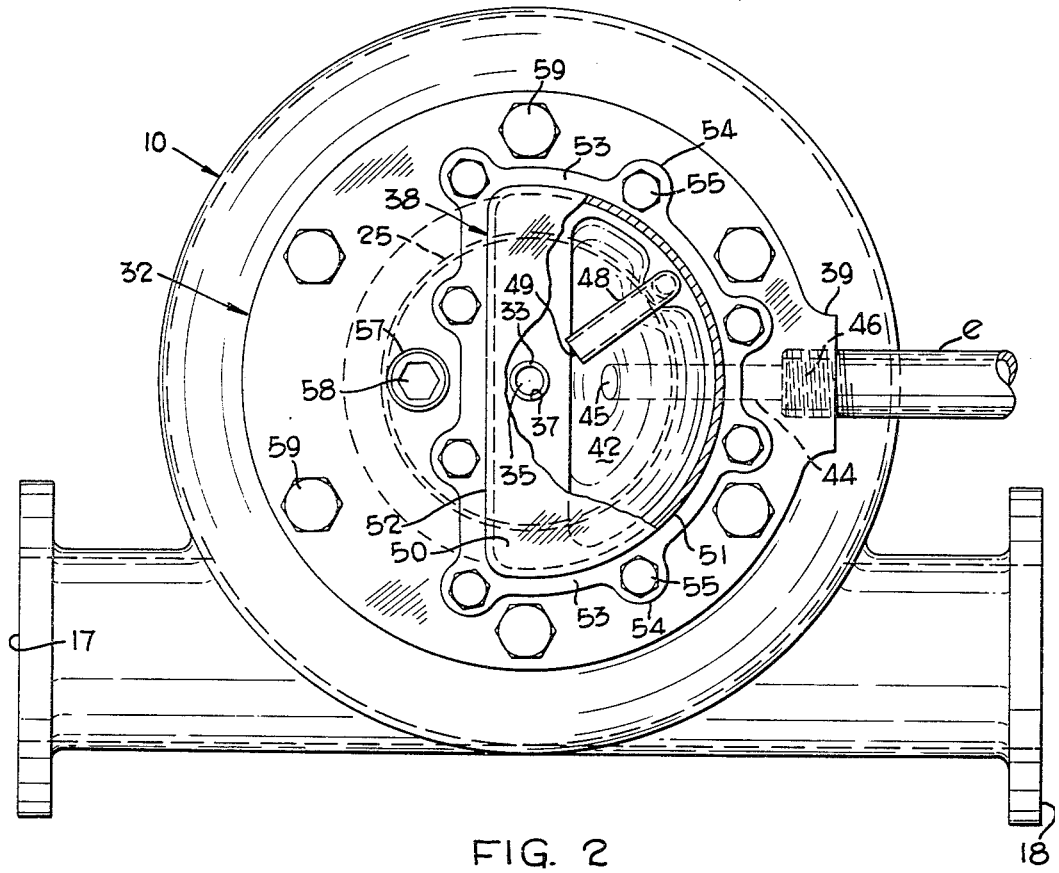
FIG. 2 is a bottom view of the air separator, with its reservoir cap partly broken away. The position of its cylindrical strainer is shown in dashed lines.

The plate 32 is relatively thick, as shown in FIG. 1 and, as shown in FIG. 2, is circular in outline save for sideward projecting boss 39. Its undersurface 36 serves as the top wall of a flow by-pass reservoir, generally designated 38. Sideward of the bore 37, its undersurface 36 has an upwardly formed air collecting recess 42, which may be a somewhat elongated dome as best shown in FIG. 2. It is spaced sideward from the tube outlet 35 so that the water in and adjacent to it will be relatively still. An air exit passage 44 of sufficient diameter to prevent surface tension bridging of air bubbles leads sideward from the top of the domed recess 42 to the outer side surface of the boss 39. The passage has a smooth inlet 45 at the top of the recess 42 and a counterbored and tapped outlet end 46 in the side wall of the boss 39, connected by a tube $e$ to an expansion tank $b$ through its bottom inlet connection $d$.

Extending downward through the plate 32, at such radial distance as to have its upper end radially outward of the strainer 25, is a by-pass flow outlet tube 48, having a curved inlet end 49 adjacent to the bottom of the reservoir 38, spaced a substantial distance from the downflow tube outlet 35.

The reservoir 38 is essentially cup shaped, having a bottom wall 50, a rounded side wall 51 more than semicylindrical in extent, a flat side wall 52, and an upper flange 53 having a series of scalloped bosses 54, best seen in FIG. 2. Machine bolts 55 through these engage the bottom plate 32. Adjacent to the portion of the flange 53 outward of the flat side wall 52, the plate 32 has a bored and tapped clean-out opening 56, closed by a headed plug 57 having an internal wrenching recess 58. The bottom plate 32 is secured to the annular flange 15 by machine bolts 59. Conventional sealing gaskets, not shown, are used between it and the flange 53, and also beneath the head of the plug 57.

The invention functions as follows: Once entrained air particles have been separated in the top central air collection dome 30, they merge as bubbles of substantial size. There is a continuous flow of water from the dome 30 down through the downflow tube 33 into the reservoir 38, at a flow rate sufficient to pick up the air bubbles in the dome 30 and carry them down into the reservoir. Since the cross-sectional area of the reservoir is many times as great as that of the tube 33, water emerging from the tube outlet 35 flows very much more slowly to the spaced-away inlet 49 of the by-pass tube 48 near the bottom wall 50 of the reservoir 38. In the slowed flow no substantial part of the air bubbles will flow downward to the by-pass flow outlet tube; rather they will separate from the flow and rise into the recess 42. From it they bubble sideward through the passage 44 outward through the tube $e$ and into the bottom inlet $d$ of the expansion tank $b$, at which they rise to join the air above the water level therein.

Since the strainer 25 is interposed between the inflow opening 17 and the outflow opening 18, there is some pressure drop across the screen 25. The flow downward through the tube 33, and upward through the by-pass tube 48 to the outer side of the screen 25 and thence to the outflow opening 18, bypasses this screen. Bypassing its pressure drop substantially compensates for resistance to flow through the tubes 33 and 48, sufficiently to assure a constant flow of water along this bypass path. Hence the top central air collection dome 30 is constantly purged of bubbles of sufficient size to separate readily from the water during its slowed flow within the reservoir 38.

Locating the expansion tank $b$ alongside the air separator body 10, at substantially the same level, thus permits installation of the air separator and expansion tank where the water pipes which connect to the inflow opening 17 and the outflow opening 18 are near the ceiling of the room in which the installation is made.

Variations in details of design and installation will occur to those familiar with the art. Accordingly, the present invention is not to be construed narrowly, but rather as co-extensive with the claims.

What is claimed is:
1. For use in separating air from a flowing liquid,
   a vortex type de-aerator having an air outlet below its upper end comprising,
   a hollow body of circular interior cross-section and having a central vertical axis and tangential inflow and outflow openings spaced axially from each other, whereby to provide rotating flow of liquid therebetween, the body having
   a top central air collection dome,
   a bottom wall, together with
   a flow by-pass reservoir below said bottom wall,
   a downflow tube extending axially having a portion extending from the top air collection dome and com- municating from a tube inlet within it downward to a downflow tube outlet into said by-pass reservoir, said reservoir having a top wall including a second air-collection dome and air outlet means at a level above that of the downflow tube outlet, a flow by-pass outlet tube means communicating from the reservoir, at a point spaced from both the downflow tube outlet and from said air outlet means, to conduct liquid flow from the reservoir, to rejoin the outflow from the body, whereby to establish a flow by-pass path through the top central air collection dome and through the reservoir to said flow bypass outlet tube means, thereby to carry air from the top central air collection dome downward to the reservoir, and passage means communicating with and leading from said second air collection dome to the exterior, thereby to duct outward the air gathered in said second dome from the liquid in the reservoir.

2. A vortex type de-aerator as defined in claim 1, wherein
the said passage means to duct the air has an outlet at the level of the bottom wall of the body.

3. A vortex type de-aerator as defined in claim 1, wherein
the body outflow opening is spaced axially below the body inflow opening, and
a strainer having a vertical axis is interposed between said openings, and
the means to conduct liquid flow from the reservoir by-passes said strainer.

4. A vortex type de-aerator as defined in claim 1, wherein
the means to conduct liquid flow from the reservoir is a tube extending downward through the bottom wall of the body and the reservoir top wall, to a level adjacent to the bottom of the reservoir.

5. A vortex type de-aerator as defined in claim 1, wherein
a vertical tubular air separator screen extends axially downwardly from the body dome to a point below the body flow inlet, concentric with and outward of the downflow tube.

6. A vortex type air separator having an air outlet adjacent to its bottom, to lead to an expansion tank at the level of the air separator, comprising
a hollow body formed as a surface of revolution about a vertical axis and having an upper tangential flow inlet and a lower tangential flow outlet, and having therebetween a central baffle smaller in diameter than the body and an annular flow passage outwardly thereof and leading downward and inward therefrom, a concentric strainer extending downward from the flow passage to the bottom of the body, said strainer being inwardly adjacent to the outflow opening, a concentric air separator screen extending vertically from the baffle to the top of the body, a hollow dome cap thereat, a downflow tube, smaller in diameter than the vertical screen, extending axially downward therethrough and having an inlet within the dome cap and having an outlet through the bottom of the body, a water reservoir whose top wall is the bottom of the body, a by-pass flow outlet from the reservoir to the body outwardly of the strainer, an air collecting recess formed upwardly in said top reservoir wall, and an air outlet connection to said recess through the bottom wall of the body, whereby to duct air outward to such an expansion tank.

References Cited

UNITED STATES PATENTS

| | | | |
|---|---|---|---|
| 2,401,079 | 5/1946 | Jones et al. | 55—205 X |
| 2,578,568 | 12/1951 | Mayer et al. | 55—205 |
| 3,151,961 | 10/1964 | Blackmore et al. | 55—205 |

REUBEN FRIEDMAN, Primary Examiner

R. W. BURKS, Assistant Examiner